United States Patent Office.

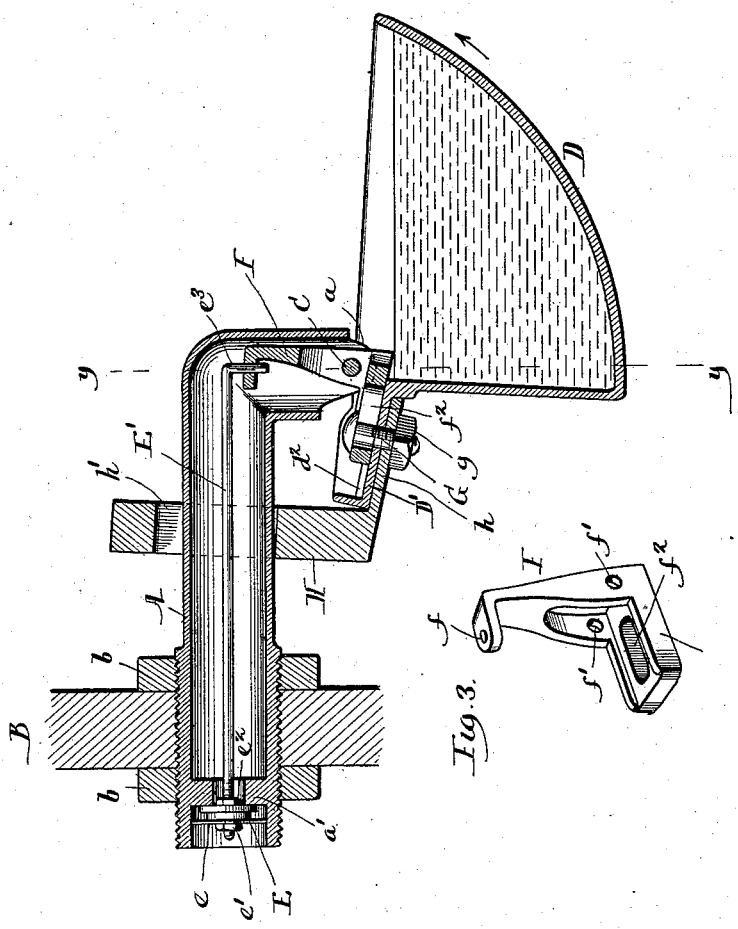

JOHN J. McCARTHY, OF CHICAGO, ILLINOIS, ASSIGNOR TO ADELBERT R. CLIZBE, OF SAME PLACE.

WATERING-TROUGH.

SPECIFICATION forming part of Letters Patent No. 651,877, dated June 19, 1900.

Application filed October 16, 1899. Serial No. 733,710. (No model.)

*To all whom it may concern:*

Be it known that I, JOHN J. MCCARTHY, a resident of Chicago, in the county of Cook and State of Illinois, have invented certain new and useful Improvements in Watering-Troughs, of which the following is a full, clear, and exact description.

The present invention has relation to that class of watering-troughs, more particularly designed for watering stock, in which the trough is pivotally sustained and provided with suitable means whereby when the trough is full of water the supply from the tank or reservoir will be automatically cut off and whereby when the supply of water within the trough is materially reduced the trough will tip and automatically open the valve to permit water to again flow into the trough to fill it.

The invention contemplates improved mechanism intermediate the trough and the supply-controlling valve for operating said valve and contemplates also improved means for suspending the trough.

The invention consists in the features of improvement hereinafter described, illustrated in the accompanying drawings, and particularly pointed out in the claims at the end of this specification.

Figure 1 is a view in central vertical section on line $x\ x$ of Fig. 2 through a watering-trough and spout embodying my invention. Fig. 2 is a view in vertical section on line $y\ y$ of Fig. 1. Fig. 3 is a detail perspective view of the valve-operating lever.

A designates a delivery pipe or spout that will be connected with a tank, reservoir, or other suitable source of supply, the spout A being shown as provided with a screw-threaded portion entering the wall B of the tank or support and securely held therein by its threads and, if desired, also by retaining-nuts $b$. The free end of the pipe or spout A is bent downwardly, and, as shown, is formed with lateral flanges $a$ at its lower end, these flanges being perforated to receive a through-bolt C, whereby the tank D is suspended, as will presently more fully appear. The inner end of the pipe or spout A is formed with a valve-seat $a'$, against the inner face of which will bear the valve E, preferably of rubber, leather, or like material, the valve E being shown as held in position upon the valve-rod E' by means of a washer $e$ and the nuts $e'$ and $e^2$, that engage the threaded end of the valve-stem E' at opposite sides of the valve. The forward end of the valve-stem E' is bent downwardly, as at $e^3$, and enters a hole $f$ in the rearwardly-extending upper end of the operating-lever F, the body of the lever F being formed with holes $f'$, through which passes the through-bolt C. As shown, the operating-lever F is an elbow-lever and its lower rearwardly-extending arm is formed with a slot $f^2$, through which passes the headed retaining-bolt C. The bolt G passes through a hole formed in the rearward extension D' of the tank D and through a hole formed in the forwardly-extending arm $h$ of the counterbalance-weight H, the upwardly-extending body of the weight H being formed with an opening $h'$, through which the pipe A passes. The lower threaded end of the bolt G is fitted with a retaining-nut $g$, that holds the several parts in position. Preferably the rearward extension D' of the trough is formed with ribs $d^2$, between which fits the lower arm of the operating-lever F.

The weight of the trough D and of the counterbalance-weight H is such that when the trough D is suspended from the spout, as shown in the drawings, and is filled with water the trough will occupy the depressed position shown in Fig. 1, being tilted downward about the pivot-bolt C. The downward tilting of the trough D causes the operating-lever F to draw forwardly the valve-rod E', thereby causing the valve E to close against the valve-seat $a'$ of the spout A. If now, however, water be withdrawn from the trough D a sufficient extent, the weight H will cause the trough D to move upward in the direction of the arrow, Fig. 1, and by this movement of the trough the operating-lever F will force rearwardly the valve-rod E', thereby moving the valve E from its seat and permitting the water to flow through the spout and into the trough D, until the trough is again turned downward to the position shown, when the water-supply to the trough will again be cut off. My object in adjustably connecting the operating-lever F to the trough is to enable the trough and the weight H to be moved slightly forward or backward in order to accurately balance the parts, and it will be seen that by setting the bolt G at different positions along the slotted lower arm of the operating-lever this balancing of the parts can be readily effected. This feature of adjustably sustaining the trough D will be found particularly advantageous when the trough is made of cast metal, since it will enable any variations in the weight of the casting to be readily compensated for.

Having thus described my invention, what I claim as new, and desire to secure by Letters Patent, is—

1. The combination of a spout having a valve-seat near its inner end and having its discharge end provided with a pivot, a valve opposite said valve-seat, a valve-rod leading from said valve to the outer end of said spout, an operating-lever engaging said valve-rod and pivoted to the discharge end of said spout, and a pivoted counterbalanced trough suspended from said spout and whereby said operating-lever is shifted to effect the opening and closing of said valves.

2. The combination of a spout having a valve-seat near its inner end and having its discharge end turned downwardly, a valve opposite said valve-seat, a valve-rod leading from said valve-seat to the outer end of said spout, an elbow-lever pivotally connected to the downwardly-turned end of said spout and having its upper end attached to said valve-rod, and a counterbalanced trough connected to the lower arm of said elbow-lever.

3. The combination of a spout having a valve-seat near its inner end and having its discharge end turned downwardly, a valve opposite said valve-seat, a valve-rod leading from said valve-seat to the outer end of said spout, an operating-lever pivotally connected to the downwardly-turned end of said spout and having its upper end attached to said valve-rod and a counterbalanced trough adjustably connected to the lower end of said operating-lever.

4. The combination of a spout having a valve-seat near its free end and having its discharge end turned downwardly, a valve opposite said valve-seat, a valve-rod leading from said valve-seat to the outer end of said spout, an elbow-lever pivotally connected to the downwardly-turned end of said spout and having its upper end attached to said valve-rod and having its lower arm slotted, a counterbalanced trough provided with a rearward extension, a weight connected to said rearward extension of said trough and a through-bolt passing through the slotted lower arm of said elbow-lever and through said trough extension and said weight.

JOHN J. McCARTHY.

Witnesses:
GEO. P. FISHER, Jr.,
ALBERTA ADAMICK.